US008416200B2

(12) United States Patent
Yoshimura

(10) Patent No.: US 8,416,200 B2
(45) Date of Patent: Apr. 9, 2013

(54) PANEL SWITCH DEVICE FOR LOAD CONTROL SYSTEM

(75) Inventor: Yuichi Yoshimura, Osaka (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 12/292,713

(22) Filed: Nov. 25, 2008

(65) Prior Publication Data

US 2009/0135155 A1 May 28, 2009

(30) Foreign Application Priority Data

Nov. 26, 2007 (JP) ................................ 2007-304725

(51) Int. Cl.
*G06F 3/041* (2006.01)
*G06F 3/00* (2006.01)

(52) U.S. Cl. ....................................... 345/173; 715/730

(58) Field of Classification Search ........................ None
See application file for complete search history.

(56) References Cited

U.S. PATENT DOCUMENTS

| | | | | |
|---|---|---|---|---|
| 5,961,570 | A * | 10/1999 | Inamori | 701/200 |
| 7,669,131 | B2 * | 2/2010 | Matsuyama | 715/730 |
| 2007/0130605 | A1 * | 6/2007 | Chung | 725/131 |
| 2007/0229465 | A1 * | 10/2007 | Sakai et al. | 345/173 |

FOREIGN PATENT DOCUMENTS

| | | |
|---|---|---|
| JP | 5-153670 | 6/1993 |
| JP | 2000-244988 | 9/2000 |
| JP | 2004-326498 | 11/2004 |
| JP | 2007-179857 | 7/2007 |
| KR | 1020040096161 A | 11/2004 |
| KR | 10-0469970 | 1/2005 |
| KR | 10-2005-0115392 | 12/2005 |

OTHER PUBLICATIONS

The Korean office action dated Dec. 27, 2010 and English summary thereof.
Korean Office Action dated Jun. 17, 2010 and the English summary thereof.

* cited by examiner

*Primary Examiner* — Daniell L Negron
(74) *Attorney, Agent, or Firm* — Bacon & Thomas, PLLC

(57) ABSTRACT

A panel switch device for use in a load control system, which includes the panel switch device serving to monitor a pressing operation of icons of loads having individual addresses allocated thereto and output to a signal line a transmission signal including operation information and address information obtained by the pressing operation of the icons of the loads, the control device serving to control each of the loads corresponding to the address information if the address information coincides with the address of each of the loads. The panel switch device includes a frame, a touch panel display unit for displaying setting items of the loads to be controlled and an output unit provided on a rear surface side of the display unit for outputting a setting content inputted through the display unit. The control device controls the loads based on the setting content outputted from the output unit.

10 Claims, 8 Drawing Sheets

PANEL SWITCH DEVICE FOR LOAD CONTROL SYSTEM

FIELD OF THE INVENTION

The present invention relates to a panel switch device for use in a load control system that controls loads such as illumination lamps or the like.

BACKGROUND OF THE INVENTION

Conventionally, there is known a load control system 40 (see, e.g., Japanese Patent Laid-open Application 2002-300680) that includes a panel switch device 41 for monitoring a pressing operation of load icons having individual addresses allocated thereto and a control device 42 for controlling loads having individual addresses allocated thereto, the panel switch device 41 and the control device 42 being connected to a signal line. The panel switch device 41 is designed to output a transmission signal, including operation information and address information obtained by the pressing operation of load icons, to the signal line. If the address information included in the transmission signal received via the signal line coincides with the address of a corresponding one of the loads, the control device 42 controls the load corresponding to the address information (FIG. 13). An operator of the load control system 40 installs dedicated software into a terminal device such as a personal computer or the like and then performs various kinds of setting, inclusive of name setting and address setting, with respect to the loads through the terminal device.

With the conventional load control system, the operator needs to carry out various kinds of setting through the terminal device such as a personal computer or the like. For that reason, a great deal of labor is required in the load setting task.

SUMMARY OF THE INVENTION

In view of the above, the present invention provides a panel switch device that assists in reducing the labor required in a load setting task.

In accordance with the present invention, there is provided a panel switch device for use in a load control system, which includes the panel switch device and a control device connected thereto via a signal line, the panel switch device serving to monitor a pressing operation of icons of loads having individual addresses allocated thereto and output to the signal line a transmission signal including operation information and address information obtained by the pressing operation of the icons of the loads, the control device serving to control the loads having the individual addresses allocated thereto and control each of the loads corresponding to the address information if the address information included in the transmission signal coincides with the address of each of the loads, the panel switch device including: a frame; a touch panel display unit arranged in the frame for displaying setting items of the loads to be controlled; and an output unit provided on a rear surface side of the display unit for outputting a setting content inputted through the display unit. Also, the control device controls the loads based on the setting content outputted from the output unit.

It is preferable that the display unit displays a page shift setting screen image used in setting an imaginary address for shifting a displayed screen image on a time basis and wherein the control device shifts the displayed screen image of the display unit based on the imaginary address inputted through the page shift setting screen image.

Further, the display unit may display a backlight control setting screen image used to set an imaginary address for controlling an on-state of a backlight of the display unit and wherein the control device controls the on-state of the backlight of the display unit based on the imaginary address inputted through the backlight control setting screen image.

The frame may preferably be formed to have substantially the same size as a double-winged attachment frame standardized for use in an embedded wiring mechanism With the panel switch device of the present invention, it is possible to perform various kinds of load setting through a display unit without having to use a terminal device such as a personal computer or the like. This makes it possible to reduce the labor required in a load setting task.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Hereinafter, a panel switch device in accordance with an embodiment of the present invention will be described with reference to FIGS. 1A to 12 which form a part hereof. Since the panel switch device of the present embodiment may be applied to, e.g., the load control system of FIG. 13 or the one disclosed in Japanese Patent Laid-open Application No. 2007-124159, descriptions and drawings thereof will be omitted.

(Construction of Panel Switch)

Figure 1A:
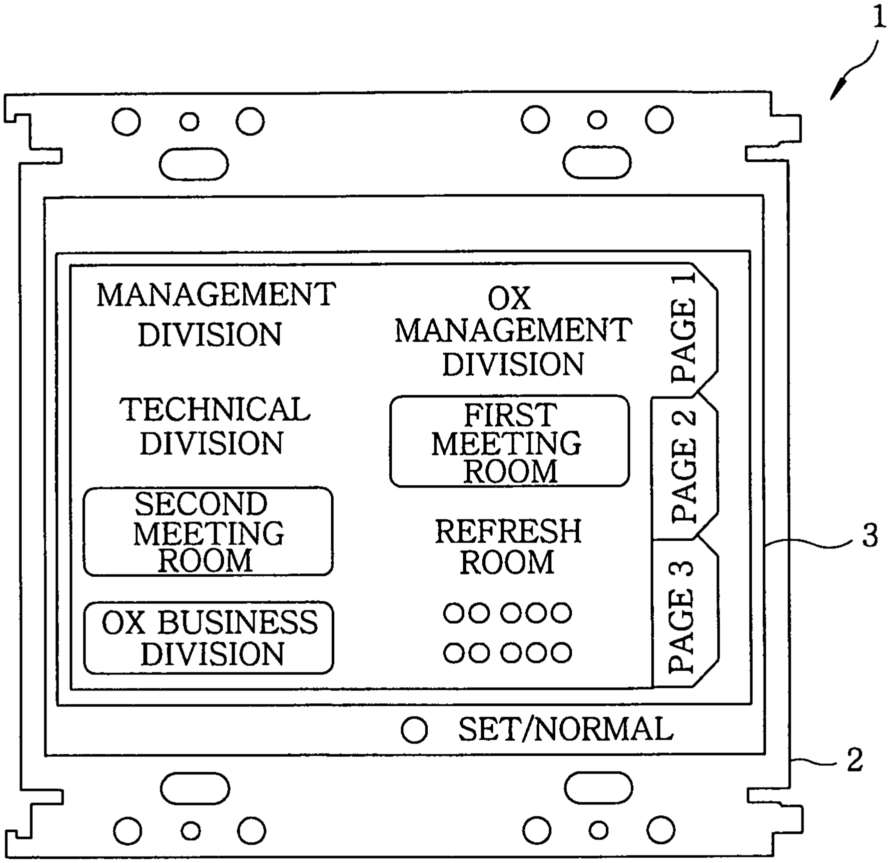
FIGS. 1A and 1B are front and side views showing the external configuration of a panel switch device in accordance with an embodiment of the present invention.
Figure 1B:
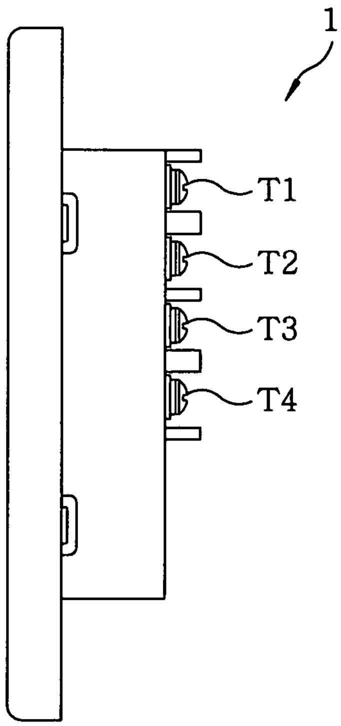

Referring to FIGS. 1A and 1B, a panel switch device 1 in accordance with an embodiment of the present invention includes, as its major elements, a frame 2, a touch panel display unit 3 arranged in the frame 2 for displaying a layout of loads such as illumination lamps or the like and various kinds of setting items, power supply terminals T1 and T2 for use in supplying electric power to the display unit 3, and input/output terminals T3 and T4 through which various kinds of signals are inputted and outputted. The frame 2 is formed to have substantially the same size as a double-winged attachment frame standardized for use in an embedded wiring mechanism. The frame 2 is embedded in an installation surface with its front surface exposed to the outside. If a user converts an operation mode from a normal mode to a setting mode, the display unit 3 displays a setting screen image 10 as illustrated in FIG. 2 so that the user can perform various kinds of setting.

(Name Setting)

Figure 2:
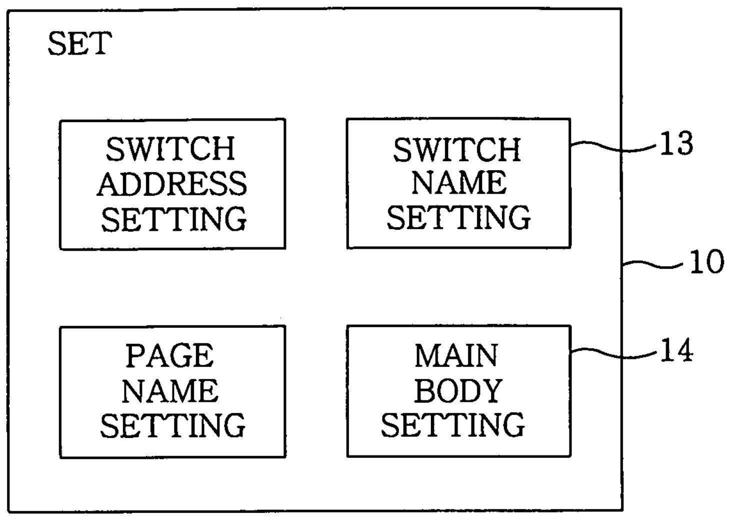
FIG. 2 is a view illustrating one example of a setting screen image.
Figure 3:
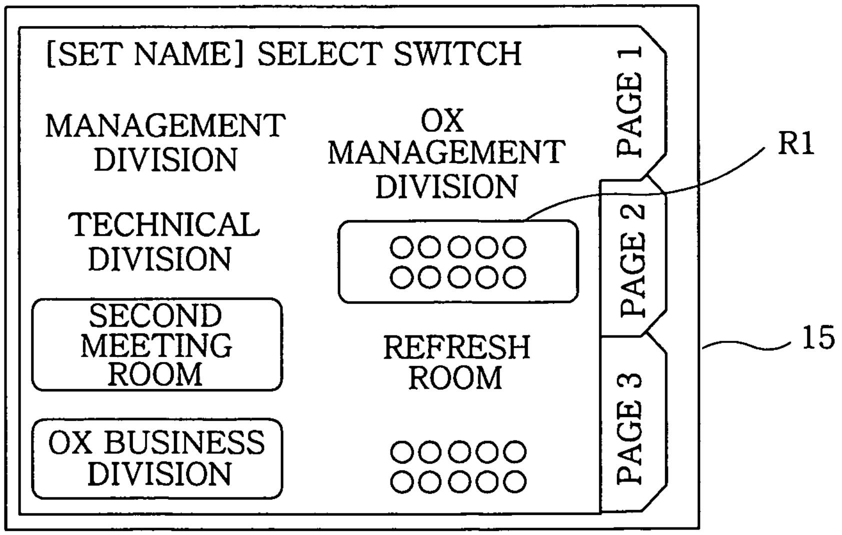
FIG. 3 is a view illustrating one example of a screen image for setting a switch name.
Figure 4:
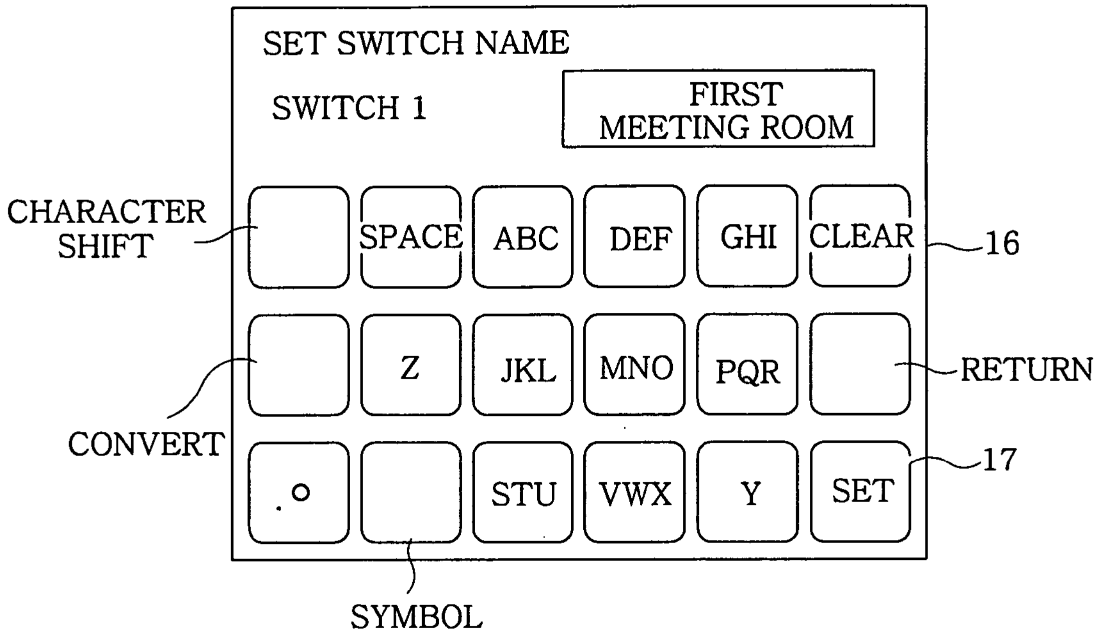
FIG. 4 is a view illustrating one example of a switch name inputting screen image prior to setting the switch name.
Figure 5:
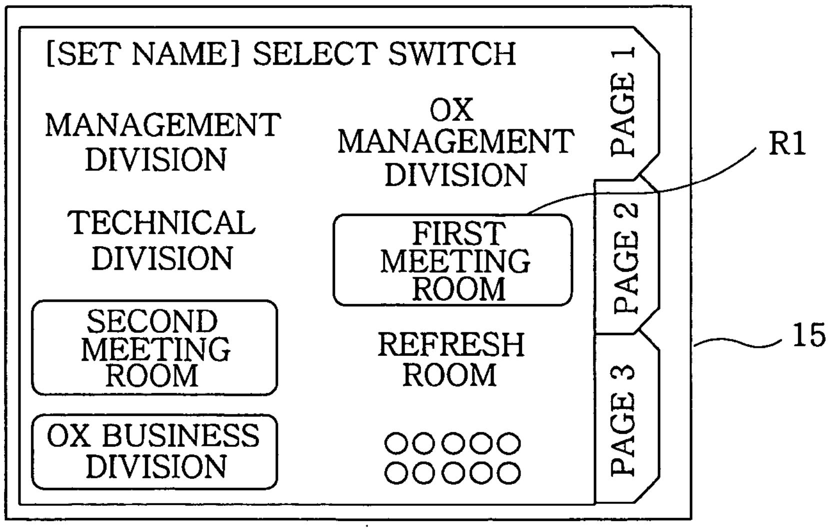
FIG. 5 is a view illustrating one example of a switch name inputting screen image after setting the switch name.

If the user presses a switch name setting icon 13 appearing in a setting screen image 10 illustrated in FIG. 2, the panel switch device 1 displays a page tag type switch name setting screen image 15 as illustrated in FIG. 3. Then, if the user selects a switch of which name is to be set (the region R1 in the example illustrated in FIG. 3), the panel switch device 1 displays a switch name input screen image 16 as illustrated in FIG. 4. If the user inputs a switch name by pressing operation buttons on the switch name input screen image 16 and then presses a setting button 17, the panel switch device 1 registers the inputted name corresponding to the switch selected by the user and displays the inputted name in the region R1 selected by the user as illustrated in FIG. 5. Since the switch name inputted by the user reads "First Meeting Room", the region R1 is labeled "First Meeting Room" in the example illustrated in FIG. 5.

With this name setting method, the user is able to perform name setting without having to use a terminal device, such as a personal computer or the like, having dedicated software installed therein. This makes it possible to reduce the labor required in setting the name. Furthermore, since the user is capable of setting an arbitrary name, the name setting method is applicable to a broader spectrum of uses and places as compared to the conventional method in which a name to be inputted is selected from a name menu.

(Page Shift Setting)

Figure 6:
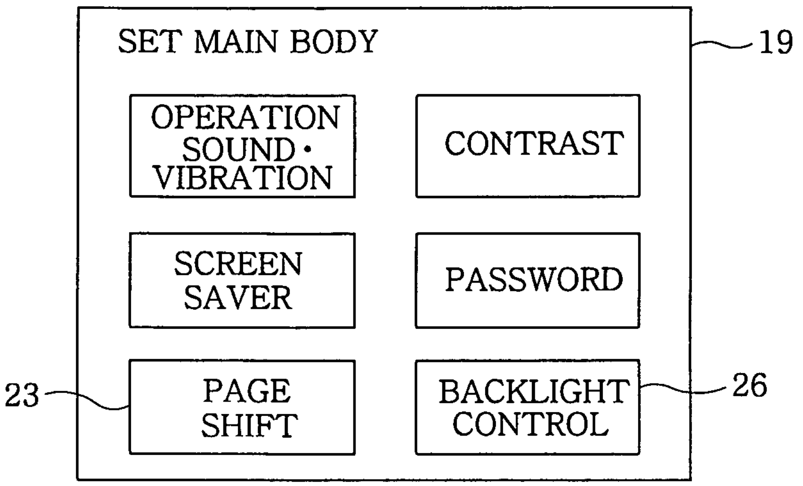
FIG. 6 is a view illustrating one example of a main body setting screen image.
Figure 7:
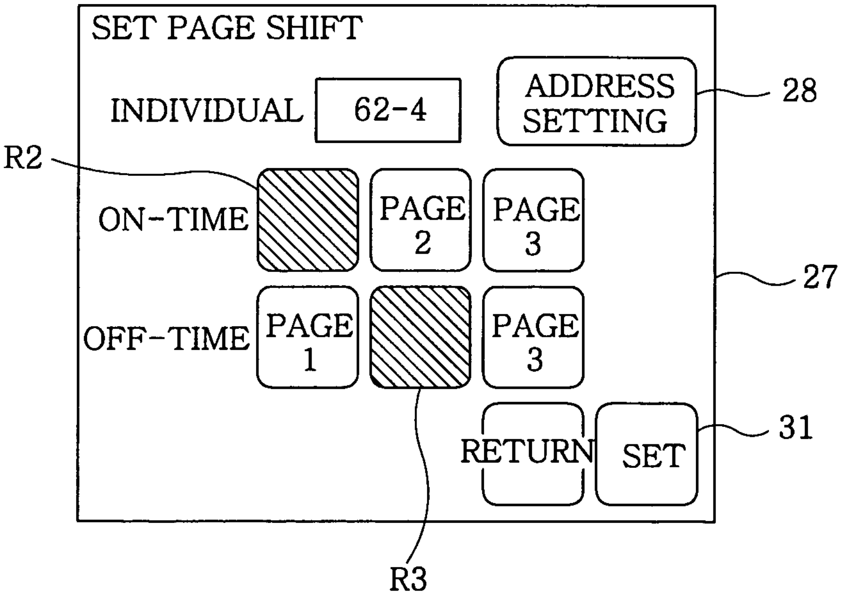
FIG. 7 is a view illustrating one example of a page shift setting screen image.
Figure 8:
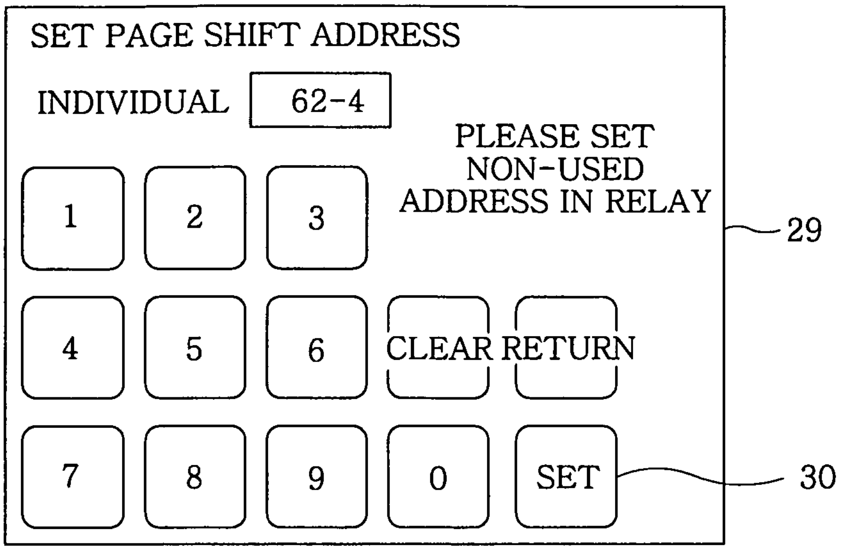
FIG. 8 is a view illustrating one example of an address setting screen image.

If the user presses a main body setting icon 14 appearing in the setting screen image 10 illustrated in FIG. 2, the panel switch device 1 displays a main body setting screen image 19 as illustrated in FIG. 6. Next, if the user presses a page shift icon 23 included in the main body setting screen image 19, the panel switch device 1 displays a page shift setting screen image 27 as illustrated in FIG. 7. The number of page to be displayed in the display unit 3 can be set using the page shift setting screen image 27. More specifically, upon pressing an address setting icon 28 included in the page shift setting screen image 27, the panel switch device 1 displays an address setting screen image 29 as illustrated in FIG. 8. Next, if the user inputs an address value by pressing operation buttons in the address setting screen image 29 and then presses a setting button 30, the panel switch device 1 registers the address value inputted by the user. If the user selects an on-time page number and an off-time page number and presses a setting button 31, the panel switch device 1 displays the on-time page number in case where the address value inputted by the user is on but displays the off-time page number in case where the address value inputted by the user is off.

In the example illustrated in FIG. 7, page 1 (corresponding to the region R2 in FIG. 7) is displayed in the display unit 3 if the address value "62-4" is on, but page 2 (corresponding to the region R3 in FIG. 7) is displayed in the display unit 3 if the address value "62-4" is off.

Figure 9:
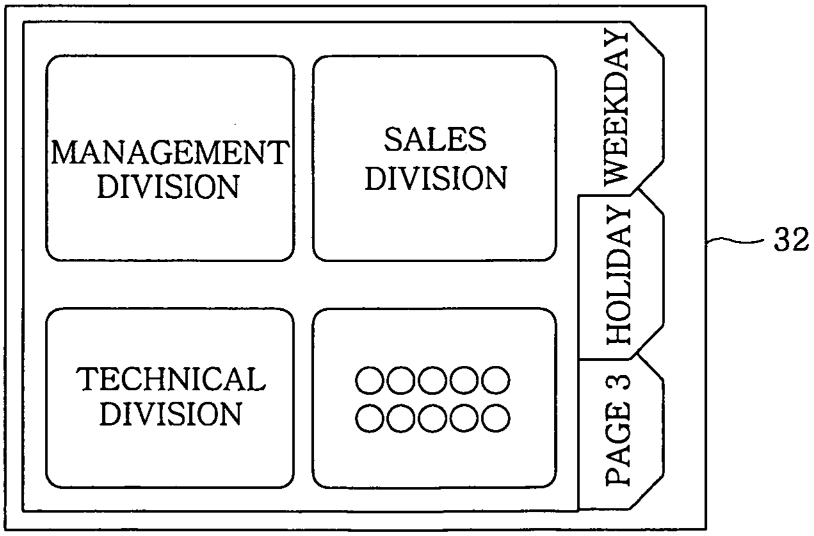
FIG. 9 is a view illustrating one example of a screen image that shows switches on a group-by-group basis.
Figure 10:
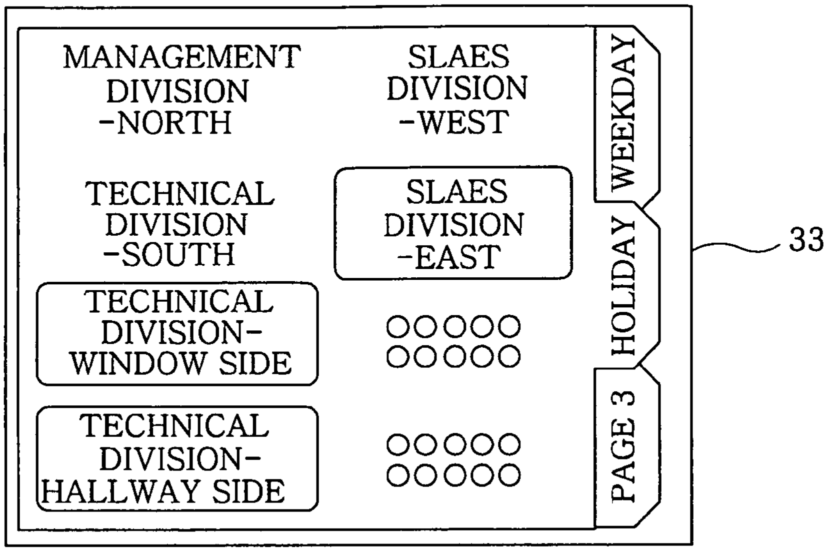
FIG. 10 is a view illustrating one example of a screen image that shows switches on a one-by-one basis.

With this page setting method, a page tag type screen image 32 indicating switches on a group-by-group basis as illustrated in FIG. 9 is displayed on a weekday so that the loads can be controlled on a group-by-group basis. On a holiday, a page tag type screen image 33 indicating switches on a one-by-one basis as illustrated in FIG. 10 is displayed so that the loads can be controlled independently. This makes it possible to assure increased convenience in using the switches and to prevent illumination lamps from being unnecessarily turned on.

(Backlight Control Setting)

Figure 11:
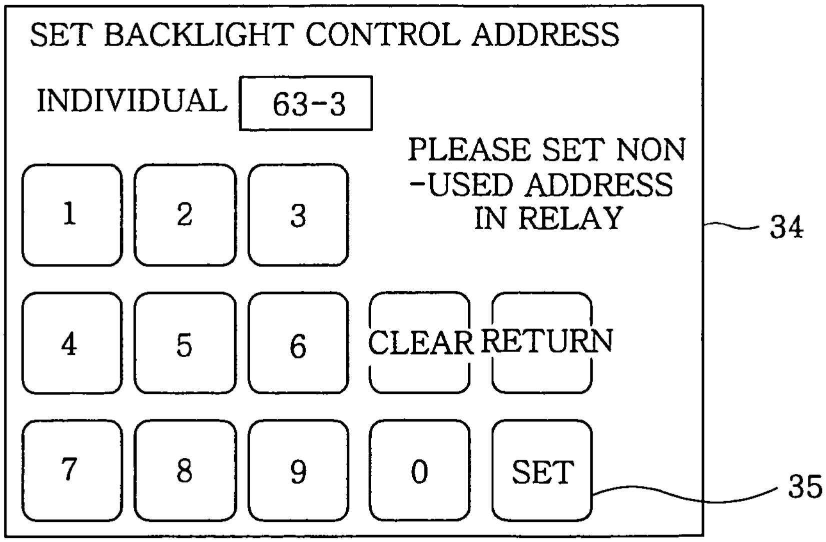
FIG. 11 is a view illustrating one example of a backlight control setting screen image.

If the user presses a backlight control icon 26 appearing in the main body setting screen image 19 illustrated in FIG. 6, the panel switch device 1 displays a backlight control setting screen image 34 as illustrated in FIG. 11. An address for turning on a backlight of the display unit 3 can be set by using the backlight control setting screen image 34. More specifically, if the user inputs an address value by pressing operation buttons in the backlight control setting screen image 34 and then presses a setting button 35, the panel switch device 1 registers the inputted address value as an address for turning on the backlight of the display unit 3.

Figure 12:
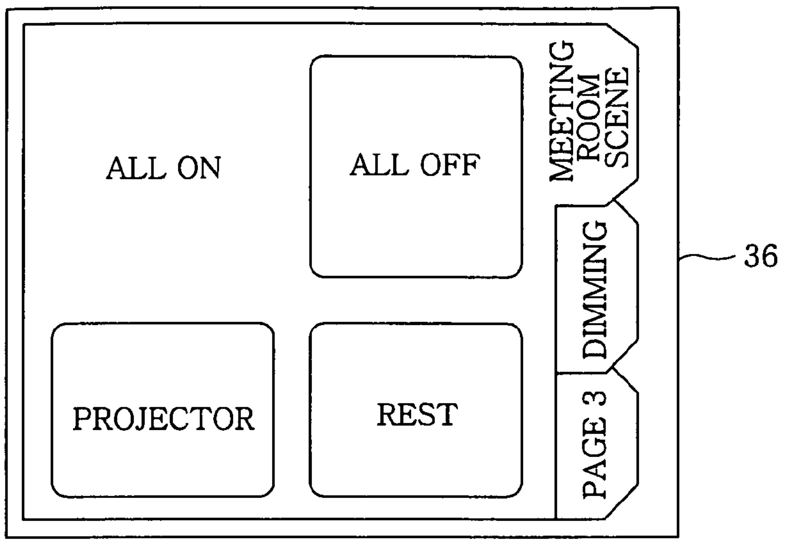
FIG. 12 is a view illustrating one example of a screen image that shows illumination setting on a scene-by-scene basis.
Figure 13:
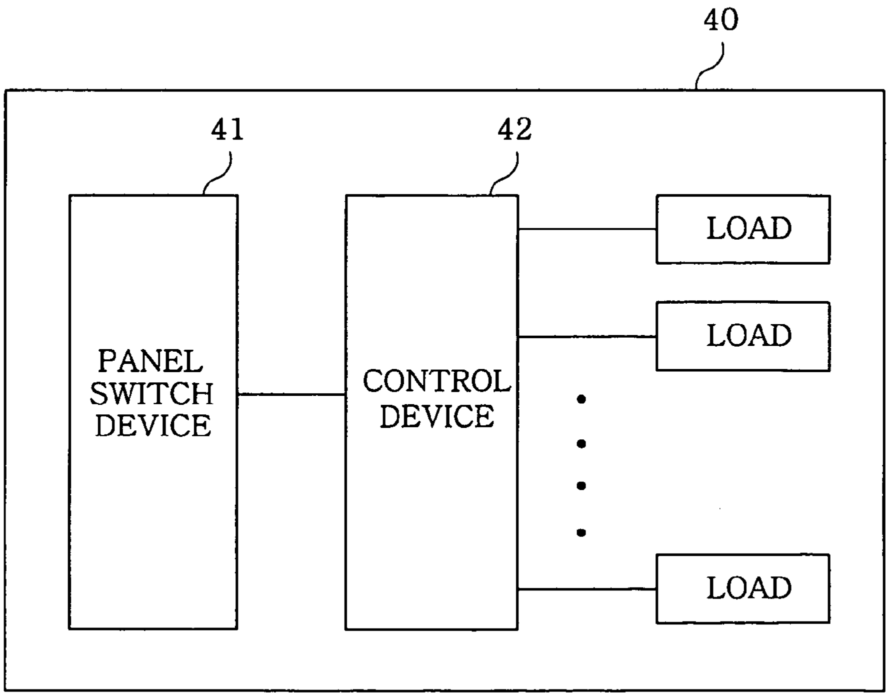
FIG. 13 (PRIOR ART)
FIG. 13 is a schematic view of a conventional load control system.

With this backlight control setting method, in case of a scene where the surrounding of the panel switch device 1 is kept dark, e.g., in case of a scene where a "projector" is in use, the address value for turning on the backlight is set into an off-state using a screen image 36 that shows a scene-by-scene illumination setting menu as illustrated in FIG. 12. Therefore, it is possible to control the panel switch device 1 in such a manner that the backlight of the display unit 3 is not turned on in case of a scene where the surrounding of the panel switch device 1 is kept dark. This assists in improving the environment in which the panel switch device 1 is used.

While one embodiment of the invention made by the present inventors has been described hereinabove, the present invention is not limited by the description and drawings of the foregoing embodiment which forms a part of the disclosure of the present invention. In other words, other embodiments, examples and operation techniques derived from the foregoing embodiment by those skilled in the art shall be construed to fall within the scope of the present invention.

While the invention has been shown and described with respect to the embodiments, it will be understood by those skilled in the art that various changes and modification may be made without departing from the scope of the invention as defined in the following claims.

What is claimed is:

1. A panel switch device for use in a load control system, which includes the panel switch device and a control device connected thereto via a signal line, the panel switch device serving to monitor a pressing operation of icons of loads having individual addresses allocated thereto and output to the signal line a transmission signal including operation information and address information obtained by the pressing operation of the icons of the loads, the control device serving to control the loads having the individual addresses allocated thereto and control each of the loads corresponding to the address information if the address information included in the transmission signal coincides with the address of each of the loads, the panel switch device comprising:

a frame;

a touch panel display unit arranged in the frame and capable of switching an operation mode between a normal mode controlling a load to be controlled and a setting mode performing various settings including a switch name setting; and an output unit provided on a rear surface side of the touch panel display unit for outputting a setting content inputted through the display unit, wherein, while performing the switch name setting, the touch panel display unit of the panel switch device displays a switch name input screen image by which switch names of loads corresponding to regions of a displayed image of the touch panel display unit of the panel switch device are inputted by using characters by a user of the panel switch device, wherein the control device controls the loads based on the setting content outputted from the output unit, and wherein the display unit displays a page shift setting screen image used in setting an imaginary address for shifting a displayed screen image on a time basis and wherein the control device shifts the displayed screen image of the touch panel display unit of the panel switch device based on the imaginary address inputted through the page shift setting screen image, wherein the page shift setting screen image provides a plurality of page numbers, and an on-time page number and an off-time page number are selected among the page numbers, and wherein the on-time page number is displayed on the touch panel display unit in case a value of the imaginary address for shifting the displayed screen image is on, and the off-time page number is displayed on the touch panel display unit in case the value is off.

2. The panel switch device of claim 1, wherein the touch panel display unit of the panel switch device displays a backlight control setting screen image used to set an imaginary address for controlling an on-state of a backlight of the touch panel display unit of the panel switch device and wherein the control device controls the on-state of the backlight of the touch panel display unit of the panel switch device based on the imaginary address inputted through the backlight control setting screen image.

3. The panel switch device of claim 2, wherein the frame is formed to have substantially the same size as a double-winged attachment frame standardized for use in an embedded wiring mechanism.

4. The panel switch device of claim 1, wherein the frame is formed to have substantially the same size as a double-winged attachment frame standardized for use in an embedded wiring mechanism.

5. The panel switch device of claim 1, wherein the plurality of page numbers include a page number for controlling the loads on a group-by-group basis and a page number for con trolling the loads independently.

6. A load control system comprising:

a panel switch device serving to monitor a pressing operation of icons of loads having individual addresses allocated thereto and output to a signal line a transmission signal including operation information and address information obtained by the pressing operation of the icons of the loads; and a control device, connected to the panel switch device via the signal line, serving to control the loads having the individual addresses allocated thereto and control each of the loads corresponding to the address information if the address information included in the transmission signal coincides with the address of each of the loads, wherein the panel switch device includes a frame, a touch panel display unit arranged in the frame and capable of switching an operation mode between a normal mode controlling a load to be controlled and a setting mode performing various settings including a switch name setting and an output unit provided on a rear surface side of the touch panel display unit of the panel switch device for outputting a setting content inputted through the touch panel display unit of the panel switch device, wherein, while performing the switch name setting, the touch panel display unit of the panel switch device displays a switch name input screen image by which switch names of loads corresponding to regions of a displayed image of the touch panel display unit of the panel switch device are inputted by using characters by a user of the panel switch device, wherein the control device controls the loads based on the setting content outputted from the output unit, wherein the display unit displays a page shift setting screen image used in setting an imaginary address for shifting a displayed screen image on a time basis and wherein the control device shifts the displayed screen image of the touch panel display unit of the panel switch device based on the imaginary address inputted through the page shift setting screen image, and wherein the page shift setting screen image provides a plurality of page numbers, and an on-time page number and an off-time page number are selected among the page numbers, and wherein the on-time page number is displayed on the touch panel display unit in case a value of the imaginary address for shifting the displayed screen image is on, and the off-time page number is displayed on the touch panel display unit in case the value is off.

7. The load control system of claim 6, wherein the touch panel display unit of the panel switch device displays a backlight control setting screen image used to set an imaginary address for controlling an on-state of a backlight of the touch panel display unit of the panel switch device and wherein the control device controls the on-state of the backlight of the touch panel display unit of the panel switch device based on the imaginary address inputted through the backlight control setting screen image.

8. The load control system of claim 7, wherein the frame is formed to have substantially the same size as a double-winged attachment frame standardized for use in an embedded wiring mechanism.

9. The load control system of claim 6, wherein the frame is formed to have substantially the same size as a double-winged attachment frame standardized for use in an embedded wiring mechanism.

10. The load control system of claim 6, wherein the plurality of page numbers include a page number for controlling the loads on a group-by-group basis and a page number for con trolling the loads independently.

* * * * *